United States Patent [19]
Maidagan

[11] Patent Number: 5,523,545
[45] Date of Patent: Jun. 4, 1996

[54] DEVICE FOR DETECTING SUCCESSFUL THREADING ON ELECTRICAL DISCHARGE MACHINES

[75] Inventor: Javier Maidagan, Durango, Spain

[73] Assignee: Ona Electro-Erosion, S.A., Spain

[21] Appl. No.: 389,922

[22] Filed: Feb. 16, 1995

[51] Int. Cl.⁶ ............................................ B23H 7/10
[52] U.S. Cl. ............................................ 219/69.12
[58] Field of Search ............................................ 219/69.12

[56] References Cited

U.S. PATENT DOCUMENTS

| | | | |
|---|---|---|---|
| 4,383,161 | 5/1983 | Corcelle | 219/69.12 |
| 4,598,189 | 7/1986 | Inoue et al. | 219/69.12 |
| 4,689,462 | 8/1987 | Goto | 219/69.12 |
| 4,814,572 | 3/1989 | Aso et al. | 219/69.12 |
| 5,051,553 | 9/1991 | Kinoshita | 219/69.12 |

*Primary Examiner*—Geoffrey S. Evans
*Attorney, Agent, or Firm*—Lucas & Just

[57] ABSTRACT

A device for detecting successful threading on electrical discharge machines which have, in their lower head, wire traction members and contact points, the detecting device being positioned downstream from and in the neighborhood of the traction members and consisting of an isolation transformer, a direct-current-to-alternating-current converter which feeds voltage to the transformer output and an amplifier comparator for the output signal of the isolation transformer.

3 Claims, 1 Drawing Sheet

DEVICE FOR DETECTING SUCCESSFUL THREADING ON ELECTRICAL DISCHARGE MACHINES

On an electrical discharge machine, the wire frequently breaks and must be rethreaded. Consequently, such machines have a suitable threading device, located upstream from the work piece.

Guiding the wire is difficult, so that the wire sometimes goes the wrong way and becomes tangled without the processor in control of threading receiving any information to the effect this is taking place.

The applicant solves the said problem by providing the machine with a wire detector, located downstream from the work piece, which informs the processor that the wire has passed, so that it knowns that the threading command and the subsequent guiding of the wire is taking place as intended, i.e., successfully.

The present invention proposes a device for the detection of successful threading of the wire for an electrical discharge machine, characterized in that it consists of:

a) An isolation transformer the first terminal of whose first coil is connected to a contact point on the wire guide downstream from the traction member of the lower head;

b) A direct-current-to-alternating-current converter which feeds voltage to the transformer output; and c) An amplifier comparator which receives the output signal from the isolation transformer and communicates it to a microprocessor which controls the wire threading device.

It is also characterized in that it has a wire guide tube located at the exit from the wire traction members located on the lower head of the machine, disposed in such a way that the contact point on the wire guide is located on the inlet mouth into the guide tube.

It is further characterized in that the second terminal of the first coil of the isolation transformer is connected directly/indirectly with the contact connection.

For the sake of a better understanding of the object of the present invention, a preferred embodiment is shown in the drawings, which embodiment may undergo minor changes without detracting from the principle involved.

Figure 1:
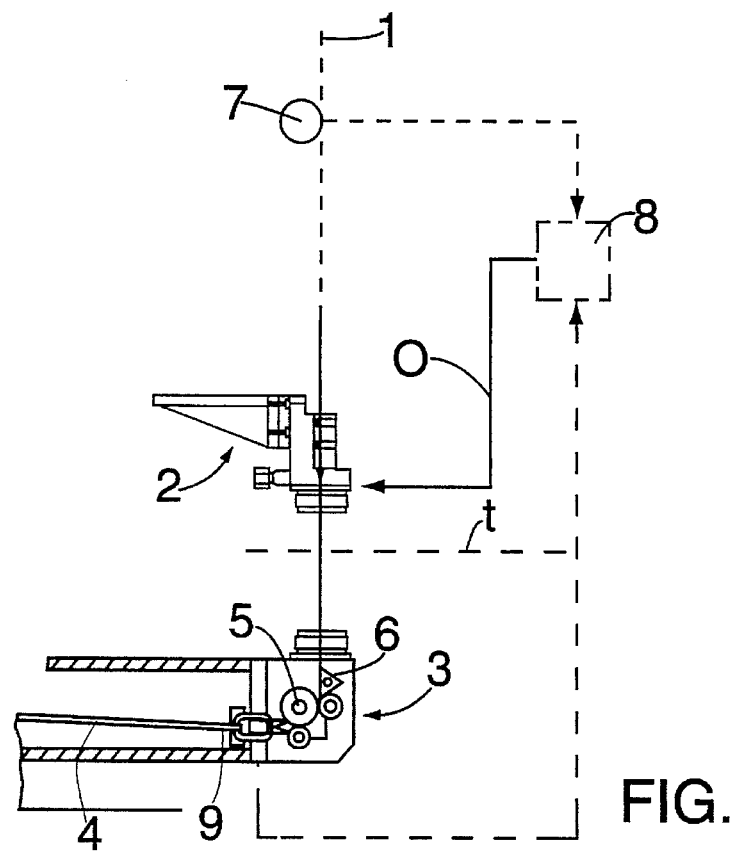
FIG. 1 is a schematic representation of the wire guide of an electrical discharge machine incorporating an embodiment of the device to which the invention relates.
Figure 2:
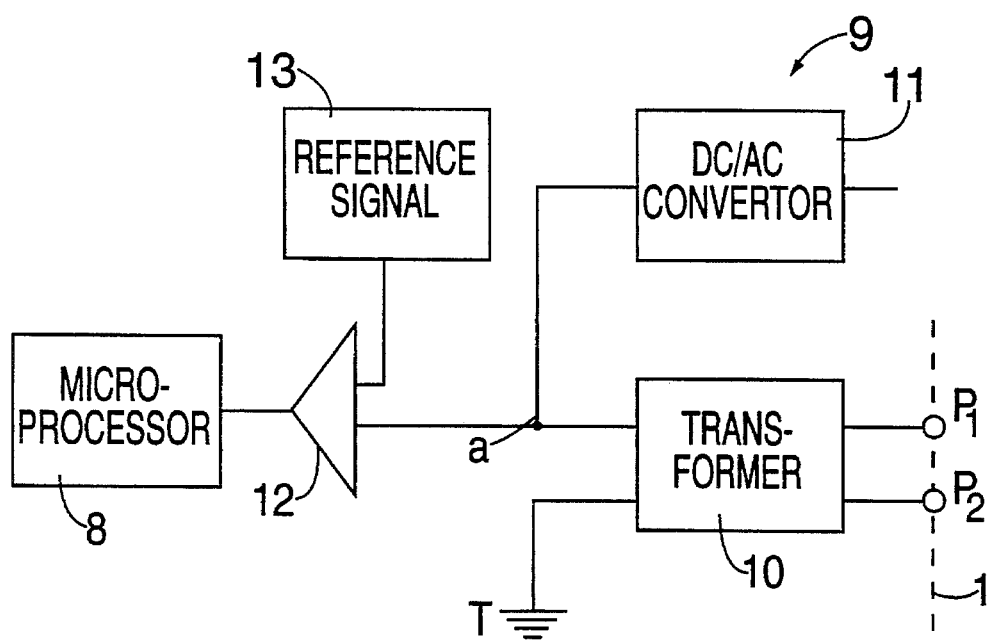
FIG. 2 is a block diagram of the detecting device in accordance with the invention.

The wire (1) passes through the upper head (2), performs its work in the work area (t), feeds into the lower head (3) and is sent through the inside of a wire guide tube (4) to a waste bin.

On both the upper head (2) and the lower head (3) there are corresponding traction members (5) and power supply points (6) to supply voltage to the wire (1).

The wire (1) breaks owing to numerous causes, whereupon the pulley (7) stops moving. This situation is picked up by a microprocessor (8) which orders (o) the start-up of a threading device, which is customarily arranged on the upper head (2).

The guiding of the wire (1) from the upper head (2) to the lower head (3) and to the guide tube (4) requires great precision, something that is not always achieved, and if the wire (1) is not guided along the preset path, it goes astray until some worker realizes it and stops the process. It can also occur that the microprocessor (8) issues a threading command but threading does not take place.

The applicant has disposed, downstream from the threading device and preferably in the place where the most serious guiding difficulties occur, or in other words, just inside the inlet mouth to the guide tube* (4), a detector (9) which detects the presence of the wire (1), that is to say, one of its contacts ($P_1$), ($P_2$), as will be explained further on, which will inform the microprocessor (8) so that it knows that its command has been performed and the guiding of the wire (1) is taking place in an acceptable manner, due to the fact that the wire (1) has been detected in the guide (4).

The preference for this position of the detector (9) in the guide tube (4) is due to the fact that, while positioning it further back downstream would provide slight additional certainty that guiding was taking place properly, if proper guiding did not take place, the wire would become far more tangled, with the possibility of damage, delays in the alarm signal, etc., etc.

The detector (9) receives the voltage signal from two contact points ($P_1$), ($P_2$), preferably in the guide line, one of which ($P_1$) is, for example, the power supply point (6) (or a point directly/indirectly connected with it), while the other contact point ($P_2$) is preferably at the inlet to the guide tube (4) or in the neighborhood of it. The fundamental thing is the place where the second contact point ($P_2$) is positioned on the guide line of the wire (1).

The first point ($P_1$), for example the power supply point (6), is at all times at the working voltage of the machine.

An isolation transformer (10) is put in place, connected via one winding to the contact points ($P_1$), ($P_2$) and via the other winding to the ground (T) and to a direct-current-to-alternating-current (DC/AC) converter (11) (oscillator).

The voltage in the tube (4) is the voltage imparted to it by the wire (1).

The second contact point ($P_2$) is positioned in the tube (4), so that if there is no wire (1), the output voltage (a) of the transformer (10) is that regulated by the DC/AC converter (11), but if the wire (1) has reached the tube (4), the voltage at the second point ($P_2$) changes—it is the voltage of the wire (1)—and the two points ($P_1$), ($P_2$) will be short-circuited, which will cause a change in the voltage at the output (a) from the transformer (10) which is picked up by the amplifier comparator (12), which receives a reference signal (13) and communicates it to the microprocessor (8), which knows in this way whether the wire (1) is or is not passing through the tube (4).

As used in the specification and claims an electrical discharge machine is an electroerosion machine.

It will be understood that the claims are intended to cover all changes and modifications of the preferred embodiments of the invention herein chosen for the purposes of illustration which do not constitute a departure from the spirit and scope of the invention.

What is claimed is:

1. A device for detecting successful threading on electrical discharge machines which have, in a lower head, a wire traction member and contact points, characterized in that the device consists of:

a) an isolation transformer the first terminal of whose first coil is connected to a contact point on a wire guide downsteam from the wire traction member of the lower head and in the proximity thereof;

b) a direct current to alternating current converter which feeds voltage to a transformer output; and c) an amplifier comparator which receives an output signal from the isolation transformer and communicates it to a microprocessor which controls a wire threading device.

2. A device for detecting successful threading on electrical discharge machines in accordance with claim 1, characterized in that the second terminal of the first coil of the isolation transformer is connected directly to the contact point.

3. A device for detecting successful threading on electrical discharge machines is accordance with claim 1, characterized in that second terminal of the first coil of the isolation transformer is connected indirectly to the contact point.

* * * * *

UNITED STATES PATENT AND TRADEMARK OFFICE
CERTIFICATE OF CORRECTION

PATENT NO. : 5,523,545
DATED : June 4, 1996
INVENTOR(S) : Javier Maidagan

It is certified that error appears in the above-indentified patent and that said Letters Patent is hereby corrected as shown below:

Column 4, line 4 (claim 3), after "that" insert --the--.

Signed and Sealed this

Fifth Day of November, 1996

Attest:

BRUCE LEHMAN

Attesting Officer

Commissioner of Patents and Trademarks